United States Patent

Shimamune et al.

[11] Patent Number: 5,965,009
[45] Date of Patent: Oct. 12, 1999

[54] METHOD OF PRODUCING ACID WATER AND ELECTROLYTIC CELL THEREFOR

[75] Inventors: Takayuki Shimamune, Tokyo; Masashi Tanaka; Yoshinori Nishiki, both of Kanagawa, all of Japan

[73] Assignee: Permelec Electrode Ltd., Kanagawa, Japan

[21] Appl. No.: 08/839,708

[22] Filed: Apr. 15, 1997

[30] Foreign Application Priority Data

Apr. 24, 1996 [JP] Japan ................................. 8-127950

[51] Int. Cl.$^6$ ................................................. C02F 1/461
[52] U.S. Cl. ........................ 205/742; 205/746; 205/556; 204/263; 204/275
[58] Field of Search .................... 205/742, 746; 204/263, 275

[56] References Cited

U.S. PATENT DOCUMENTS 5,167,777 12/1992 Kaczur et al. ............................ 205/746
5,589,052 12/1996 Shimamune et al. ..................... 205/349

*Primary Examiner*—Arun S. Phasge
*Attorney, Agent, or Firm*—Sughrue, Mion, Zinn, Macpeak & Seas, PLLC

[57] ABSTRACT

A method of electrolytically producing acid water using an electrolytic cell partitioned by a cation-exchange membrane into an anode chamber and a cathode chamber. Chloride ion which generates hypochlorous acid by anodic oxidation is supplied to the cathode chamber without directly supplying chloride ion to the anode chamber. Part of the chloride ion permeates from the cathode chamber into the anode chamber through the cation-exchange membrane. The chloride ion which permeates through the cation-exchange membrane is present at the surface of an anode closely adhering to the cation-exchange membrane in the anode chamber or only in the vicinity of the anode, and is efficiently anodically oxidized to form hypochlorite ion. Also disclosed is an electrolytic cell for carrying out the method of electrolytically producing acid water.

7 Claims, 1 Drawing Sheet

FIGURE
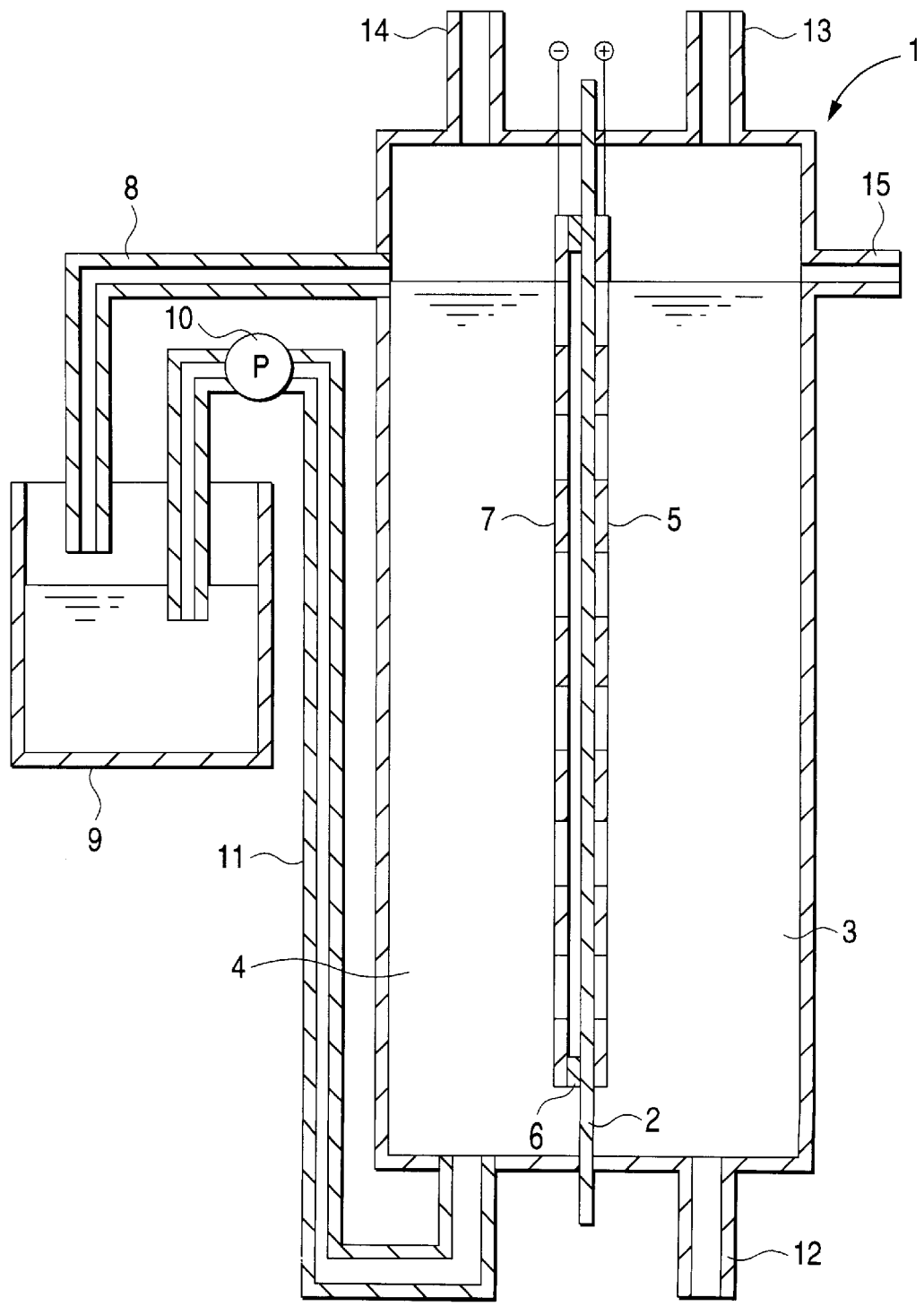

METHOD OF PRODUCING ACID WATER AND ELECTROLYTIC CELL THEREFOR

FIELD OF THE INVENTION

The present invention relates to a method of producing acid water having a high oxidation and reduction potential and a low pH with good efficiency using a two-chamber-type electrolytic cell, and to an electrolytic cell for producing the acid water. More specifically, the present invention relates to a method of producing acid water and an electrolytic cell for producing the same and, in particular, strong acid water containing a reduced amount of chloride. The acid water is useful for various sterilization techniques, and is obtained by efficiently anodically oxidizing chloride ion that is supplied to the electrolytic cell.

BACKGROUND OF THE INVENTION

The catholyte which is also called alkaline water obtained by electrolyzing municipal water with a diaphragm-type electrolytic cell is effective as a medicine and is also said to have improved taste. Thus, the catholyte has enjoyed widespread use. Recently, the reduced quality of municipal water has resulted in an unpleasant odor and bad taste. As a countermeasure therefor, an apparatus for producing alkali ion water (alkaline water) has been widely used which is capable of simultaneously removing impurities and deodorizing the water by incorporating active carbon or a microfilter in the above-described electrolytic cell.

On the other hand, for the production and washing of electronic parts, specially prepared sulfuric acid, hydrofluoric acid, hydrogen peroxide, hydrochloric acid, etc., has hitherto been used. However, because impurities are introduced into the system and the purification technique for removing such impurities is troublesome, a method of producing acid water for washing by a water electrolysis technique has been proposed. The electrolysis is carried out by adding a slight amount of chloride ion to the anode chamber to thereby obtain an acid electrolyte having a very high oxidation reduction potential (ORP). Because the resulting solution has a strong sterilizing action and a strong disinfecting action initially as well as after use, sodium chloride or chloride ion alone remains to the same extent as in municipal water. Thus, when the used wash solution is discarded, problems such as secondary pollution, etc., do not occur. The above-described solution, therefore, has been widely used for various applications. However, as the case may be, there is a possibility of generating a small amount of organic chlorine compounds. Thus, one cannot conclude that such solutions are harmless to humans.

In the water electrolysis, when ammonium chloride ($NH_4Cl$) or sodium chloride, for example, is used as an electrolyte in the anode chamber, the anodic reaction is represented by:

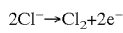
$$2Cl^- \rightarrow Cl_2 + 2e^-$$

The chlorine gas thus formed reacts with water to cause a disproportionation reaction represented by:

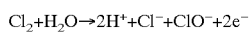
$$Cl_2 + H_2O \rightarrow 2H^+ + Cl^- + ClO^- + 2e^-$$

When the separation property of the diaphragm is sufficient, the solution in the anode chamber becomes acidic with the hydrogen ion of the hydrogen chloride thus formed, and a hypochlorous acid solution having a pH of 3 or less and an ORP of higher than 1.2 volts is formed. However, in practice, the separation property of the diaphragm is insufficient. When the electrolysis is carried out by adding a salt such as sodium chloride, etc., to the anode chamber for obtaining strong acid water, the ORP of the anolyte is increased but there is a problem in that the pH tends to not be sufficiently lowered.

To avoid this problem, there has been a proposal to increase the thickness of the above-described diaphragm and to increase the distance between the electrodes. This in turn would restrain diffusion of the liquids to thereby prevent the reaction products from mixing with one another. However, because the electric conductivity of water is quite low, a large electric current cannot be passed between the electrodes of the electrolytic cell and the actual current density is from 1 to 2 $A/dm^2$. To obtain a large amount of acid water, plural electrodes must be combined. The resulting apparatus is large-sized which complicates the structure thereof including plumbing, and it takes too much time to maintain the apparatus.

To overcome these problems, the present inventors previously proposed a method of electrolysis using a cation-exchange membrane as the diaphragm, where the anode and cathode contact the respective sides of the cation-exchange membrane to form a substantial solid electrolyte. According to this method, when the current density is increased by a factor of 10 times or higher, that is, to 10 $A/dm^2$ or higher, the cell voltage is maintained at a few volts. This makes electrolysis possible at a voltage far lower than that found in conventional methods. In this method, the present inventors also proposed a method of producing an acid water having a high ORP in the anode chamber by carrying out the electrolysis while adding a chlorine-containing compound such as hydrochloric acid, sodium chloride, etc., to the anode chamber.

In this method, acid water having a high ORP is obtained in the anode chamber, alkaline water having a low ORP is obtained in the cathode chamber, and both the anolyte and catholyte are useful for washing. The electrolytic reaction for obtaining acid water by this method is the formation of hypochlorite ion by the oxidation of chloride ion as described above. However, this method is disadvantageous in that the oxidation efficiency of the chloride ion is not always increased. Thus, a large amount of the above-described chlorine-containing compound had to be added to the anolyte. Furthermore, because the hydrogen ion thus formed permeates into the cathode chamber through the cation-exchange membrane, in order to achieve a sufficiently low pH, excessive electrolysis is required. Moreover, even when excessive electrolysis was carried out, a sufficiently low pH was not always obtained.

The ORP obtained by electrolysis of the above-described chlorine-containing compound is regulated by the concentration of the hypochlorite ion thus formed. Hypochlorite ion in a concentration of from 1 to 5 pm is sufficient, and chlorine gas is generated if the concentration thereof exceeds 5 ppm. If the current efficiency of chlorine generation is assumed to be 10%, the pH is from 1 to 4. To achieve a desired pH of 3 or lower, which is a measure of strong acid water, excessive electrolysis which ignores the current efficiency of chlorine generation is needed. Chlorine gas is generated when the chloride ion concentration is high and when the chloride ion concentration is low, the electrolysis amounts to simple water electrolysis.

To overcome these problems, the concentration of chloride ion in the anolyte present at the surface of the anode or in the vicinity thereof desirably is relatively low. If possible, this would be an ideal method of producing acid water such that almost all of the chloride ion is effectively used for forming hypochlorite ion and excessive residual chlorine is not present in the acid water thus formed. However, it was hitherto considered impracticable to maldistribute the chloride ion, which is dissolved and diffused in the whole anolyte, so that it has a higher concentration in the vicinity of the anode.

SUMMARY OF THE INVENTION

It is therefore an object of the present invention to provide a method of producing acid water and an electrolytic cell therefor, wherein the above-described problems of conventional techniques are solved by removing chloride ion from the vicinity of the anode, the practice of which has hitherto been considered to be unattainable.

The above object has been achieved in a first aspect of the present invention by providing a method of producing acid water by carrying out electrolysis while supplying raw material water to a water electrolytic cell which is partitioned by a cation-exchange membrane into an anode chamber having an anode disposed therein and a cathode chamber and recovering acid water from the anode chamber, which comprises supplying a chlorine compound comprising chloride ion to the cathode chamber, permeating a part of the chloride ion formed by dissolution of said chlorine compound from the cathode chamber into the anode chamber through the cation-exchange membrane, and contacting the permeated chloride ion with the anode to oxidize the chloride ion.

In yet another aspect, the present invention provides an electrolytic cell for producing acid water comprising a cathode chamber having an inlet for supplying a solution of a chlorine compound, an anode chamber having an outlet for recovering acid water, a cation-exchange membrane partitioning the electrolytic cell into said anode chamber and cathode chamber, an anode disposed in the anode chamber and closely adhering to the anode chamber side of the cation-exchange membrane, and a cathode disposed in the cathode chamber.

BRIEF DESCRIPTION OF THE DRAWING

FIG. 1 is a schematic cross sectional view showing an example of the acid water-producing electrolytic cell of the present invention.

DETAILED DESCRIPTION OF THE INVENTION

The present invention is described in detail below.

It is considered that anions do not substantially pass through a cation-exchange membrane but in fact, a slight amount of anions do pass through the membrane. For example, when about 200 g/liter of an aqueous sodium chloride solution is present in the anode chamber during electrolysis, the concentration of chloride ion in the catholyte is not zero but is generally 100 ppm or lower, and usually about 40 ppm. The concentration of chloride ion depends somewhat on the kind of cation-exchange membrane that is used in the electrolytic cell.

In the present invention, by utilizing the specific anion permeability of the cation-exchange membrane, chloride ion is supplied at the vicinity of the anode in the anode chamber such that chloride ion is present only at the surface of the anode or at the vicinity of the anode. The chloride ion is subjected to oxidation treatment by the anode to convert chloride ion to hypochlorous acid, etc., to solve the above-described shortcomings of conventional techniques.

The acid water obtained in the present invention having an effective chlorine concentration of about 10 ppm or lower is adequate. In consideration of the above-described matter, when chloride ion having a concentration of about 100 ppm is present at the vicinity of the anode, the desired acid water is sufficiently obtained but if possible, chloride ion having a concentration of 1,000 ppm is preferably present at the vicinity of the anode.

The situation may differ to some extent depending on the kind and thickness of the cation-exchange membrane that is used and also on the electrolytic conditions. However, when a saturated aqueous sodium chloride solution is supplied to the cathode chamber of an electrolytic cell which is partitioned into an anode chamber and a cathode chamber by a cation-exchange membrane, a small amount of the high-concentration chloride ion in the cathode chamber permeates through the cation-exchange membrane and is transferred to the anode chamber side of the cation-exchange membrane. The chloride ion concentration becomes from about 1 to 10,000 ppm, which is suitable for the electrolytic production of acid water.

Because chloride ion is supplied to the anode chamber through the cation-exchange membrane, the chloride ion is maldistributed near the surface of the cation-exchange membrane (i.e., within the anolyte, chloride ion is present in greater concentration near the surface of the cation-exchange membrane as compared with points further away from the surface of the cation-exchange membrane), and the maldistributed chloride ion is easily brought into contact with the anode and oxidized to form the desired hypochlorite ion. That is, because chloride ion slightly present in the anolyte is oxidized with good efficiency and a slight amount of chloride ion is continuously supplied from the cathode chamber side, the chloride ion present only at the vicinity of the anode in the anode chamber is oxidized into hypochlorite ion with high efficiency. Also, because chloride ion does not substantially diffuse in the anolyte, the effective chlorine content of the acid water thus obtained does not reach an unnecessarily high level. Furthermore, because the desired reaction can be practiced while maintaining a low chloride ion concentration, the desired acid water having a high ORP and a low pH can be obtained with a good efficiency, that is, with a high current efficiency.

In particular, when the anode is closely adhered to the cation-exchange membrane, the possibility of diffusing chloride ion which passes through the cation-exchange membrane in the anolyte is reduced, and the chloride ion concentration at the surface of the anode is kept at a desired value.

In the present invention, a cation-exchange membrane is used as a diaphragm as described above. It may be considered desirable to use an anion-exchange membrane for transferring chloride ion present in the cathode chamber to the anode chamber. However, if an anion-exchange membrane is used, the amount of the chloride ion transferred to the anode chamber becomes too large. As a result, the chloride ion concentration at the vicinity of the anode becomes too high and an unnecessary chlorine gas generating reaction becomes the main reaction. Thus, a cation-exchange membrane is used in the present invention.

By using a cation-exchange membrane, a cation such as sodium ion present in the cathode chamber easily permeates through the above-described cation-exchange membrane and reaches the anode chamber. However, no problem occurs in this regard because the cation returns to the cathode chamber under influence of an electric field.

The chlorine compound solution supplied to the cathode chamber preferably is an aqueous sodium chloride solution, and in particular, a saturated aqueous sodium chloride solution. However, an aqueous potassium chloride solution can also be used. In conventional acid water production, it is necessary to control the chloride ion concentration in an anolyte by controlling the amounts of sodium chloride and hydrochloric acid which are added to the anolyte. However, when a saturated aqueous sodium chloride solution is supplied in the present invention, the sodium chloride concentration in the cathode chamber is constant. As a result, the chloride ion permeability of the cation-exchange membrane is almost constant, and the chloride ion concentration in the anode chamber or more precisely at the vicinity of the anode in the anode chamber is almost constant. Thus, the above-described concentration control becomes unnecessary.

When a chlorine compound solution is supplied to the cathode chamber, it is desirable to constitute the supply system such that a dissolving bath for the chlorine compound is disposed separately from the electrolytic cell. The chlorine compound is added in excess to the dissolving bath to form a saturated aqueous chlorine compound solution or an aqueous chlorine compound solution having a high concentration near the saturated solution level. The solution is circulated to the above-described electrolytic cell, and furthermore the catholyte after use is circulated to the above-described dissolving bath. For example, in the case of using sodium chloride as the chlorine compound, excess sodium chloride is added to the above-described dissolving bath such that a sodium chloride precipitate is always present in the dissolving bath to supply the consumed amount of sodium chloride. Also, in the case of using hydrochloric acid as the chlorine compound solution, a similar supplement is necessary, and hydrochloric acid having a relatively high concentration is added to the above-described dissolving bath to supply the consumed amount thereof. As described above, in the present invention, it is necessary to supplement the consumed part of the chlorine compound, but concentration control of the chlorine compound supplied as described above becomes unnecessary. Also, when a liquid level meter and a pH meter are disposed in the above-described dissolving bath, the amount and the pH of the catholyte can be maintained at predetermined ranges.

When using hydrochloric acid as the chlorine compound solution, if the concentration thereof is high, handling thereof is inconvenient and the electrolytic cell and pipes are corroded. Thus, it is preferred to use diluted hydrochloric acid having a concentration of from about 10 to 15%.

That is, from the viewpoint of ease of handing, the chlorine compound solution which is supplied to the cathode chamber as the catholyte is preferably a saturated aqueous sodium chloride solution. When there is a need for a weakly acidic solution of a chlorine compound, an aqueous sodium chloride solution containing a slight amount of hydrochloric acid is used. Furthermore, diluted hydrochloric acid, an aqueous potassium chloride solution, etc., can also be used in the present invention The anode substance for use in the present invention is selected from substances which can efficiently form hypochlorite ion by oxidizing chloride ion which permeates through a cation-exchange membrane, and is practically selected from platinum-group metals or the oxides thereof, such as platinum, iridium oxide, etc., and composite oxides of these metals. The anode substance is preferably coated on a base material such titanium, etc., to constitute an insoluble metal electrode.

On the other hand, there is no particular limitation on the cathode because the cathode does not take part in the oxidation of chloride ion. A base material such as carbon, titanium, nickel, stainless steel, etc., can be used as such or after subjecting the surface thereof to a roughening treatment as the cathode. Also, the base material surface may carry thereon a catalyst substance. Unlike the anode, the cathode does not have a function of holding chloride ion at the surface of the electrode. Thus, it is unnecessary to closely adhere the cathode to the cation-exchange membrane by employing a so-called zero gap system.

When electrolysis is carried out using such an electrolytic cell while supplying a chlorine compound solution such as a saturated aqueous sodium chloride solution, etc., to the cathode chamber and municipal water or weakly acidic water to the anode chamber, the chloride ion present in the cathode chamber permeates through the cation-exchange membrane to enter the anode chamber. The chloride ion is anodically oxidized in the anode chamber to form hypochlorous acid and the anolyte becomes slightly acidic. On the other hand, hydrogen is generated and hydroxide ion is formed in the cathode chamber ($2H_2O+2e \rightarrow H_2+2OH^-$). The hydroxide ion reacts with cations in the liquid to form a hydroxide, whereby the catholyte becomes alkaline.

If the alkalinity becomes high, the transfer of the chloride ion to the anode chamber is hindered. The current efficiency for forming hypochlorous acid is then lowered and he acidity of the anolyte is sometimes lowered. Thus, it is desirable to neutralize the catholyte by circulating it to the above-described dissolving bath. By performing this operation, the alkalinity of the catholyte is lowered and the catholyte becomes almost neutral.

In the production of acid water and alkaline water by conventional municipal water electrolysis, the minerals contained in municipal water, such as calcium and magnesium precipitate as the hydroxides thereof in the cathode chamber. For removing the precipitates, an electric current is passed in the opposite direction. However, by disposing a pH meter in the above-described dissolving bath and keeping the pH at a range, for example, lower than 9, within which precipitates tend not to form, it becomes unnecessary to pass an electric current in the opposite direction (i.e., opposite the direction of electrolysis) as described above or the frequency thereof can be greatly reduced. Furthermore, by employing the above-described means, even when the chlorine compound solution contains minerals, precipitates are not formed. Thus, municipal water containing minerals can be used in the present invention. However, when the electrolysis is carried out for a long period of time, minerals gradually accumulate in the system. Thus, for removing minerals, it is desirable to dispose a filter at the outlet of the catholyte, or to treat the water used for preparing the solution of the chlorine compound in an ion-exchange resin tower for deionization, or to periodically exchange the catholyte.

In addition to the cathode chamber, a similar dissolving bath may be connected to the anode chamber to circulate the anolyte therethrough and to control the amount and pH of the liquid.

FIG. 1 is a schematic cross sectional view showing an example of the acid water producing electrolytic cell of the present invention.

Electrolytic cell 1 is partitioned by a cation-exchange membrane 2 into an anode chamber 3 and a cathode chamber 4. A mesh-form anode 5 is closely disposed to the surface of the cation-exchange membrane 2 in anode chamber 3. On the other hand, a mesh-form cathode 7 is disposed at the surface of the cation-exchange membrane 2 in the cathode chamber via a frame-form spacer 6.

Catholyte circulation pipe 8 is equipped to a liquid level portion of the cathode chamber 4. Catholyte is circulated through the circulation pipe 8 to a sodium chloride dissolving bath 9 disposed outside the electrolytic cell and filled with a saturated aqueous sodium chloride solution. After being re-saturated in the dissolving bath 9, the saturated aqueous sodium chloride solution is circulated to the bottom of the cathode chamber 4 through a circulation return pipe (chlorine compound solution inlet) 11 by means of a circulation pump 10.

An anolyte inlet 12 is provided at the bottom of the anode chamber 3, an anode gas product outlet 13 is provided at the top plate of the anode chamber 3, a cathode gas product outlet 14 is provided at the top plate of the cathode chamber 4, and an acid water outlet 15 is provided at the liquid level portion of the anolyte of the anode chamber 3.

When an electric current is applied between the anode 5 and the cathode 7 while supplying a saturated aqueous sodium chloride solution from the sodium chloride dissolving bath 9 to the cathode chamber 4 through a circulating return pipe 11 by means of the circulation pump 10 and supplying an anolyte such as municipal water, diluted hydrochloric acid, etc., to the anode chamber 3 from the anolyte inlet 12, a slight amount of the large amount of chloride ion contained in the cathode chamber 4 permeates through the cation-exchange membrane 2 and is transferred to the anode chamber 3. The transferred chloride ion is immediately oxidized at the surface of the anode 5 to form hypochlorite ion and does not diffuse in the anolyte. Accordingly, the chloride ion supplied to the anode chamber is converted into hypochlorite ion with a good efficiency. This contributes to an improvement in ORP and a lowered pH. The anolyte is then recovered as an acid water having the desired properties from the acid water outlet 15.

The following Examples illustrate the method of producing acid water of the present invention. However, the present invention should not be construed as being limited thereto in any way.

EXAMPLE 1

An anode composed of a platinum-plated titanium-made perforated plate having a thickness of 1 mm having holes each having a diameter of 2 mm at intervals of 3 mm was disposed in an anode chamber of a two-chamber-type electrolytic cell partitioned by a cation-exchange membrane, Nafion 117 (trade name, made by E. I. du Pont de Nemours and Company) into the anode chamber and a cathode chamber. The anode was closely adhered to the anode chamber side of the cation-exchange membrane. Also, a cathode composed of a titanium-made expand mesh was disposed in the cathode chamber near the cation-exchange membrane via a frame-form polypropylene-made spacer.

A sodium chloride dissolving bath was disposed outside the cathode chamber of the electrolytic cell having a capacity of 10 liters and containing a saturated aqueous sodium chloride solution prepared from purified sodium chloride and municipal water such that undissolved sodium chloride remained in the dissolving bath. The dissolving bath was connected to the cathode chamber as shown in FIG. 1 such that the saturated aqueous sodium chloride solution was circulated as a catholyte. In addition, a pH meter connected to a chemical-pouring pump was equipped to the sodium chloride dissolving bath, and hydrochloric acid was added thereto such that the aqueous sodium chloride solution in the bath was adjusted to a pH of from 6 to 6.5. In addition, municipal water containing hydrochloric acid at a concentration of 50 ppm was supplied to the anode chamber.

When electrolysis was carried out by passing therethrough an electric current of 10 A (current density of 13 $A/dm^2$), the electrolytic voltage was 4.0 volts and strong acid water having a pH of 2.5 and an ORP of 1,100 mV was formed at a rate of 5 liters/minute in the anode chamber. The total chloride concentration in the strong acid water was 60 ppm. In addition, after 24 hours, there were signs of a slight increase in the amount of water contained in the sodium chloride dissolving bath due to permeation from the cation-exchange membrane.

COMPARATIVE EXAMPLE 1

Electrolysis was carried out using the same electrolytic cell as in Example 1 by passing therethrough an electric current of 10 A. A dilute aqueous sodium chloride solution containing 50 ppm of hydrochloric acid was supplied to the anode chamber and municipal water was supplied to the cathode chamber, at a total chloride concentration of 60 ppm, 500 ppm, or 1,000 ppm. When the total chloride concentration was 60 ppm, acid water having a pH of 2.5 and an ORP of 850 mV was obtained. Thus, the ORP was hardly increased. When the total chloride concentration was 500 ppm, acid water having a pH of 2.5 and an ORP of 850 mV was obtained. When the total chloride concentration was 1,000 ppm, acid water having a pH of 2.3 and an ORP of 1,000 mV was first obtained.

By comparing the results of Example 1 and Comparative Example 1, it is seen that in Example 1, the consumption of sodium chloride is restrained and also the chlorine concentration in the acid water thus obtained is greatly reduced.

EXAMPLE 2

Electrolysis was carried out under the same conditions as in Example 1, except that the cathode was also closely adhered to the cation-exchange membrane and an aqueous potassium chloride solution prepared by dissolving potassium chloride in municipal water was used in place of the aqueous sodium chloride solution as the catholyte. Untreated municipal water was supplied to the anode chamber at a rate of 1 liter/minute, and hydrochloric acid was not added to the anolyte. As a result of the electrolysis, acid water having a pH of 2.8 and an ORP of 1,200 mV was obtained from the anode chamber at a rate of about 1 liter/minute at an electrolytic voltage of 3.8 volts. The total chloride concentration was 320 ppm.

COMPARATIVE EXAMPLE 2

Electrolysis was carried out under the same conditions as in Comparative Example 1, except that a diluted aqueous sodium chloride solution having a total chloride concentration of 1,000 ppm was supplied to the anode chamber at a rate of 1 liter/minute. The acid water thus obtained had a pH of 2.6 and an ORP of 980 mV. In this case, when the amount of sodium chloride consumed was increased to 3 times the amount in Example 2, a desired acid water could not be obtained.

EXAMPLE 3

Electrolysis was carried out under the same conditions as in Example 2, except that an aqueous solution of 10% hydrochloric acid was used as the catholyte. Strong acid water having a pH of 2.4 and an ORP of 1,150 mV was obtained from the anode chamber.

Electrolysis was also carried out by adding an aqueous solution of 25% hydrochloric acid to the cathode chamber to keep the hydrochloric acid concentration of the catholyte at 10%, adding the increased part of the catholyte to the anolyte and decreasing the electric current to 7 A. The pH of the anolyte became 3.2 and acid water having a pH of 2.6 and an ORP of 1,100 mV was obtained as an anolyte perhaps due to the increase of chlorine concentration in the anode chamber.

As described above, the present invention is directed to a method of producing acid water by carrying out electrolysis while supplying raw material water to a water electrolytic cell which is partitioned by a cation-exchange membrane into an anode chamber having an anode disposed therein and a cathode chamber and recovering acid water from the anode chamber, which comprises supplying a chlorine compound to the cathode chamber, permeating part of the chloride ion formed by dissolution of said chlorine compound into the anode chamber through the cation-exchange membrane, and contacting the permeated chloride ion with the anode to oxidize the chloride ion.

In the production of acid water by the anodic oxidation of chloride ion in accordance with the present invention, chloride ion is supplied to the anode chamber by permeating the chloride ion through the cation-exchange membrane from the cathode chamber. Accordingly, the chloride ion which is transferred into the anode chamber from the cathode chamber maldistributes at the surface of the anode in the anode chamber side of the cation-exchange membrane or at the vicinity of the anode and does not diffuse in the whole (bulk) anolyte. Thus, the above-described chloride ion is efficiently oxidized at the surface of the anode to form hypochlorite ion, and acid water is effectively prepared with less excessive chloride ions. Thus, it becomes possible to produce acid water meeting the object of the present invention. Also, because the oxidation efficiency of chloride ion is increased, the amount of electric power that is consumed is reduced, and economical operation and an improved utilization ratio of the chlorine compound are achieved.

Also, because the amount of the chloride ion which permeates through the cation-exchange membrane from the cathode chamber to the anode chamber is scarcely influenced by the concentration of the chlorine compound present in the cathode chamber, it becomes unnecessary to control the concentration of the chlorine compound in the cathode chamber. Thus, the electrolytic operation can be far simply practiced as compared with conventional techniques.

Furthermore, in the present invention, when a saturated aqueous sodium chloride solution is used as the chlorine compound solution, the amount of chloride ion which permeates through the cation-exchange membrane and is present at the surface of the anode closely adhering to the cation-exchange membrane is suitable for forming acid water having the desired pH and ORP.

The apparatus of the present invention is an electrolytic cell for producing acid water comprising a cathode chamber having an inlet for supplying a solution of a chlorine compound, an anode chamber having an outlet for recovering acid water, a cation-exchange membrane partitioning the electrolytic cell into said anode chamber and cathode chamber, an anode disposed in the anode chamber side of the cation-exchange membrane closely adhering to the anode chamber side of the cation-exchange membrane, and a cathode disposed in the cathode chamber side of the cation-exchange membrane.

By using the above apparatus, acid water can be produced in accordance with the above-described method of the present invention. This is because in the apparatus of the present invention, the anode is closely adhered to the cation-exchanged membrane, and diffusion of chloride ion in the anolyte which is transferred into the anode chamber by permeating through the cation-exchange membrane is effectively restrained. Also, ohmic loss of the anolyte is minimized and energy savings can be achieved.

Furthermore, in the apparatus of the present invention, a liquid level meter and a pH meter can be disposed in the chlorine compound dissolving bath. By disposing a pH meter in the above-described dissolving bath for circulating the catholyte, the pH of the catholyte is readily controlled. In this manner, the precipitation of minerals, which tends to occur in the cathode chamber of a conventional acid water producing electrolytic cell, can be substantially prevented.

While the invention has been described in detail and with reference to specific embodiments thereof, it will be apparent to one skilled in the art that various changes and modifications can be made therein without departing from the spirit and scope thereof.

What is claimed is:

1. A method of producing acid water by carrying out electrolysis while supplying raw material water to a water electrolytic cell which is partitioned by a cation-exchange membrane into an anode chamber having an anode disposed therein and a cathode chamber and recovering acid water from the anode chamber, which comprises supplying a chlorine compound comprising chloride ion to the cathode chamber, permeating a part of the chloride ion formed by dissolution of said chlorine compound from the cathode chamber into the anode chamber through the cation-exchange membrane, and contacting the permeated chloride ion with the anode to oxidize the chloride ion.

2. The method of producing acid water as claimed in claim 1, which comprises supplying a saturated aqueous sodium chloride solution to the cathode compartment.

3. The method of producing acid water as claimed in claim 1, which comprises supplying a saturated aqueous potassium chloride solution to the cathode compartment.

4. The method of producing acid water as claimed in claim 1, wherein the anode is disposed in the vicinity of the cation-exchange membrane.

5. The method of producing acid water as claimed in claim 1, wherein the anode is closely adhered to the anode chamber side of the cation-exchange membrane.

6. The method of producing acid water as claimed in claim 1, wherein all of the chloride ion that is supplied to the electrolytic cell during electrolysis is supplied to the cathode chamber and substantially no chloride ion is directly supplied to the anode chamber.

7. The method of producing acid water as claimed in claim 1, which comprises supplying water to the cathode chamber.

* * * * *